United States Patent
Bush et al.

(10) Patent No.: US 7,365,613 B2
(45) Date of Patent: Apr. 29, 2008

(54) METHOD OF DETERMINING RESONANT FREQUENCY

(75) Inventors: Craig Palmer Bush, Lexington, KY (US); Martin Christopher Klement, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 93 days.

(21) Appl. No.: 11/465,924

(22) Filed: Aug. 21, 2006

(65) Prior Publication Data

US 2008/0074718 A1  Mar. 27, 2008

(51) Int. Cl.
- H03B 5/30 (2006.01)
- H03L 5/00 (2006.01)
- H02K 33/00 (2006.01)
- G02B 26/10 (2006.01)

(52) U.S. Cl. .............. 331/155; 331/183; 310/36; 359/199; 359/225

(58) Field of Classification Search ............ 331/154, 331/155, 182, 183; 310/36; 359/197–199, 359/223–226, 372

See application file for complete search history.

(56) References Cited

U.S. PATENT DOCUMENTS 6,585,338 B2 * 7/2003 Harris .................... 331/4

* cited by examiner

*Primary Examiner*—David Mis
(74) *Attorney, Agent, or Firm*—Luedeka, Neely & Graham, P.C.

(57) ABSTRACT

A method for operating a torsion oscillator at its resonant frequency. The method performs an open-loop frequency sweep starting with nominal operation parameters saved from the factory or from a previous operation of the torsion oscillator. The sweep determines an open-loop resonant frequency and an open-loop drive level. A closed-loop resonant frequency sweep is performed and a closed-loop steady-state resonant frequency is determined. This frequency is used to calculate a closed-loop overshoot and a closed-loop steady-state drive level. The torsion oscillator is then operated in a closed-loop mode at the closed-loop steady-state resonant frequency and starting at the closed-loop steady-state drive level. Finally, the nominal operation parameters are updated and stored in non-volatile memory. The method minimizes the effects of ambient environmental conditions including air density on the steady-state operation of the torsion oscillator.

20 Claims, 8 Drawing Sheets

METHOD OF DETERMINING RESONANT FREQUENCY

FIELD

This invention relates to the field of oscillating mechanisms. More particularly this invention relates to torsional oscillators and the systems used to drive torsional oscillators used in scanners, printers, and similar systems.

BACKGROUND AND SUMMARY

Electro-mechanical oscillators may be used to drive electro-optical mechanisms such as printers, scanners, barcode readers and similar devices. A torsion oscillator, which is one type of oscillation device and may also be referred to as a resonant galvanometer, typically includes a mirror that is disposed on a plate that is cut or etched from a silicon wafer and supported on trunnions. In one embodiment, magnets are attached to the plate and when electric current passes through a nearby coil, a force is exerted on the magnets. This force is translated to the plate and causes oscillation of the plate which twists the trunnions. Other forces may be employed to make such a system oscillate, such as electric fields or mechanical forces. The plate is excited to oscillate, preferably at or near a resonant frequency, by an oscillation controller that causes current to pass through the coil at or near a drive or power level that results in the plate oscillating at or near the resonant frequency or at or near a harmonic of the resonant frequency.

The angle of the mirror moves sinusoidally with respect to time at a certain amount of sweep (termed amplitude), at a certain repetition rate (termed frequency), and with a potential lack of symmetry (termed median offset). The characteristics of mirrors can vary significantly due to physical variations from manufacturing tolerances and changing environmental conditions. Specifically, changes in air density affect drive efficiency, the resonant frequency of a torsion oscillator, and the ability to detect resonance. Thus, changes in elevation or other environmental parameters may affect the sweep performance of a torsion oscillator. The present invention is a method for controlling a torsion oscillator that reduces instances of off-resonant operation given changes in environmental conditions.

The above and other needs are met by a method that addresses the effects of air density on resonant frequency detection by using closed-loop feedback to ensure that the drive amplitude ($A_d$) at the open-loop drive frequency ($f_{dOL}=f_{rOL}-OS$) is approximately equal to the closed-loop steady-state amplitude ($A_{CL}$) and by using a closed-loop frequency sweep to determine the effect of air density on the open-loop resonant frequency sweep.

Each time the imaging system is reset (such as during power-on reset), information from a previous operation of the torsion oscillator is read from non-volatile memory. This information includes values which allow the imaging system to determine the most recent resonant frequency of the torsion oscillator, the last measured overshoot of the resonant frequency sweep algorithm and the open-loop drive level required to make the peak open-loop scan amplitude approximately equal to the closed-loop steady-state amplitude. The system first performs an open-loop resonant frequency sweep, applies the last measured overshoot to the result and drives the torsion oscillator at the determined drive frequency. If the measured amplitude is not within an acceptable amount of the desired closed-loop steady-state amplitude for the drive frequency, then the open-loop drive level is increased or decreased by a set amount or by a characterized input vs. output function, and the open-loop resonant frequency sweep is repeated until the drive amplitude ($A_d$) and closed-loop amplitudes ($A_{CL}$) are acceptably close to each other. The imaging system now has an updated value of what open-loop drive level ($P_{OL}$) will produce approximately the same scan amplitude as what is desired during closed-loop steady-state operation.

Once the result of the open-loop resonant frequency sweep produces acceptable amplitude results, the imaging system enters closed-loop control. The imaging system then performs a closed-loop sweep of frequency and amplitude target pairs while monitoring the closed-loop controller feedback. The closed-loop steady-state resonant frequency is the frequency for which the controller output was a minimum. Alternatively, a conditional search for the minimum controller output can be performed, starting with the frequency and amplitude target on initial closed loop entry, and incrementing the target pairs in the direction indicating decreasing controller output until a minimum is found. The frequency corresponding to the minimum controller feedback is the closed-loop steady-state resonant frequency. The difference between the frequency at controller minimum and the resonant frequency detected by the open-loop sweep is the overshoot of the open-loop sweep. The imaging system now has an updated value of the overshoot and of the torsion oscillator closed-loop steady-state resonant frequency. The overshoot value is primarily a function of air density and will not change as long as the open-loop sweep method (e.g., rate at which the drive frequency is changed during the sweep) does not change, so the closed-loop sweep need not be repeated until the next POR.

The imaging system monitors the closed-loop controller feedback while the torsion oscillator is operating in steady-state. This feedback may be incorporated into the drive level of the next open-loop resonant frequency sweep to ensure that the open-loop amplitude will continue to be approximately equal to the closed-loop steady-state amplitude. Making use of the closed-loop feedback in this manner helps ensure that the next open-loop resonant frequency sweep will not fail the open-loop vs. closed-loop amplitude check, which would result in a longer time to first print due to the need to repeat the open-loop sweep.

The imaging system now has a record of the last detected resonant frequency, the open-loop drive level necessary to produce a valid resonant frequency sweep and the correct overshoot of the resonant frequency sweep. All subsequent resonant frequency sweeps should now complete in the shortest amount of time possible without sacrificing accuracy. The torsion oscillator will exhibit the desired scanning motion and will therefore not introduce print artifacts associated with off-resonant operation of the torsion oscillator.

BRIEF DESCRIPTION OF THE DRAWINGS

The invention may be best understood by reference to the detailed description when considered in conjunction with the figures, which are not to scale so as to more clearly show the details, wherein like reference numbers indicate like elements throughout the several views, and wherein.

DETAILED DESCRIPTION

In many scanners and printers used with computers, data terminals, digital imaging systems, and similar devices, a light beam (preferably a laser beam) is reflected off a torsion oscillator minor to sweep a target. In very general terms, torsion oscillator construction is such that its motion is controlled by the characteristics of the electrical drive signal supplied to it, including the power level and the drive frequency. Specifically, in order to maintain stability the drive signal should be maintained substantially at the resonant frequency of the torsion oscillator.

A system for operating an imaging system typically includes a circuit for driving the system's torsion oscillator in a closed-loop scan amplitude control and at a substantially resonant frequency. The drive signal (also referred to as the "input signal") may be any form of signal such as a sinusoidal signal, an impulse signal, a square wave signal or any other type of signal. Sensors are positioned along the sweep of the laser.

To set the drive frequency, it is desirable to know the resonant frequency of the mirror and its mechanical mounting mechanism (torsion oscillator). To find the approximate resonant frequency, a sweep amplitude feedback signal, such as one produced by sensors for sensing the sweep of the device, is measured as the frequency of the drive signal is swept through a range of frequencies. Next, the peak amplitude of the laser sweep and the frequency associated with the peak amplitude are determined based on the sweep amplitude feedback signal. The frequency at peak amplitude approximately corresponds to the resonant frequency of the torsion oscillator. When the system is operating, in order to achieve stable operation of the system, the drive level may be controlled by a closed-loop control for maintaining the desired scan amplitude of the laser sweep at a constant frequency. This may be done through closed loop control with feedback coming from the laser sensors. The closed-loop controller changes the power level of the input signal in order to maintain the constant amplitude of the laser sweep while also maintaining the input signal at what was determined to be the resonant frequency.

The resonant frequency of the system depends in part on ambient environmental conditions such as air density and it also depends on the amplitude of the oscillation (the amplitude of the laser sweep). The present invention takes these factors into account when setting the drive frequency of the system. A description of a representative embodiment of a torsion oscillator and an imaging system incorporating a torsion oscillator are described in FIGS. 1 and 2 below. This embodiment is an example of the invention, but the invention could take many different physical forms.

Figure 1:
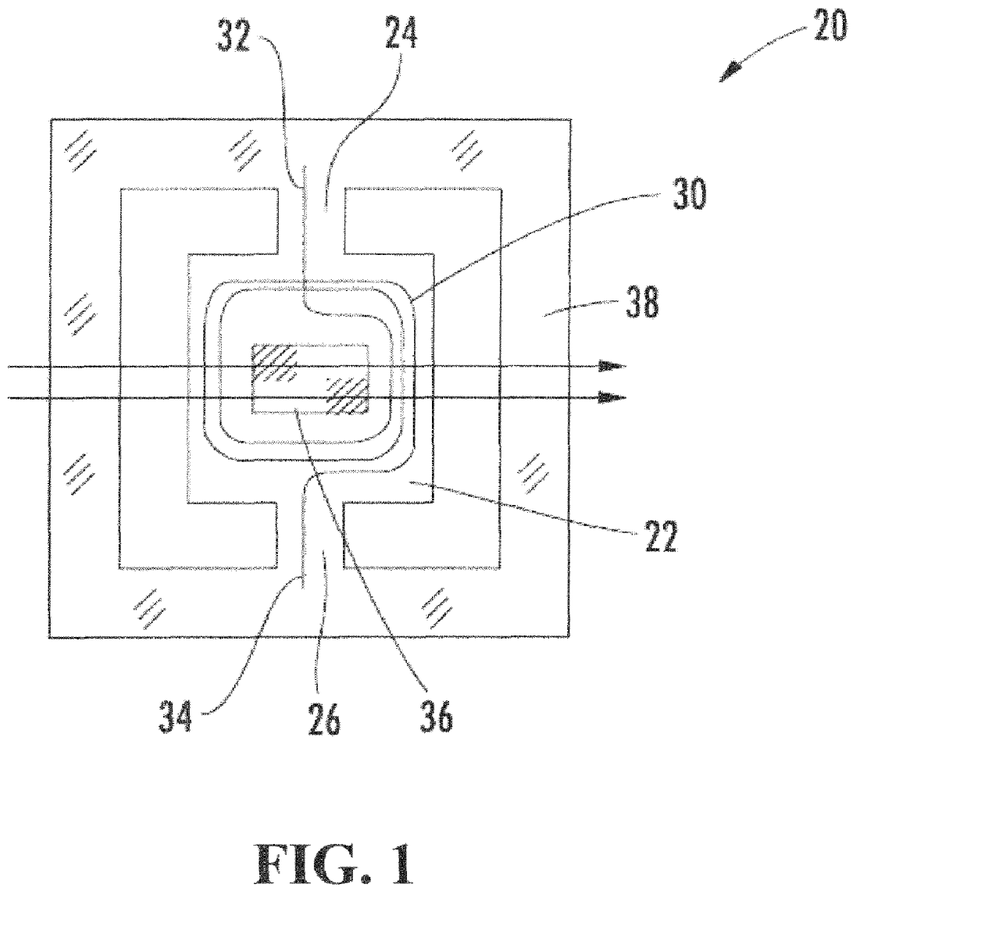
FIG. 1 is a schematic plan view of a representative torsion oscillator.

Referring to FIG. 1, a representative torsion oscillator 20, which also may be referred to as a resonant galvanometer 20, includes a central generally rectangular plate 22 suspended by two extensions 24 and 26 of the material of the plate 22. The extensions 24 and 26 also are integral with a surrounding frame 28. The plate 22 is generally symmetrical about its axis of oscillation, which axis is defined by the extensions 24 and 26. Typically, the plate 22, extensions 24 and 26, and frame 28 are cut or etched from a single silicon wafer. A coil 30 of an electrically conductive material and having terminals 32 and 34, and a reflective surface 36 such as a mirror 36 are placed on the central plate 22. Since silicon is itself about 60% reflective, the mirror 36 may simply be a smooth or polished surface region on the central plate 22. Typically, however, the mirror 36 is a deposited layer of material, such as gold, on a smooth silicon substrate. The central plate 22 and coil 30 are within a magnetic field, represented by arrows 38, which may be produced by permanent magnets (not shown). When a current is driven through the coil 30, a force is exerted on the coil 30, which force is transferred to the plate 22. This force causes movement of the plate 22 about the axis defined by the extensions 24 and 26, which twist with reverse inherent torsion. Thus, rotational movement is created when electrical drive power (voltage and current) is applied to the coil 30. The spring rate of the extensions 24 and 26 and the mass of the central plate 22 constitute a spring mass system with a specific mechanical resonant frequency, resulting in an oscillating mirror 36. As one example, the mechanical resonant frequency is approximately 3.2 kHz. Typical maximum mechanical deflection is ±23°. In very general terms, the construction of the torsion oscillator 20 is such that motion of the central plate 20 and mirror 36 is controlled by the characteristics of the electrical drive power supplied to the torsion oscillator, in particular, to the coil 30 through connections to the terminals 32 and 34. (In alternate embodiments, permanent magnets may be mounted on the plate 22, and the coil 30 may be proximately disposed to the plate 22).

Figure 2:
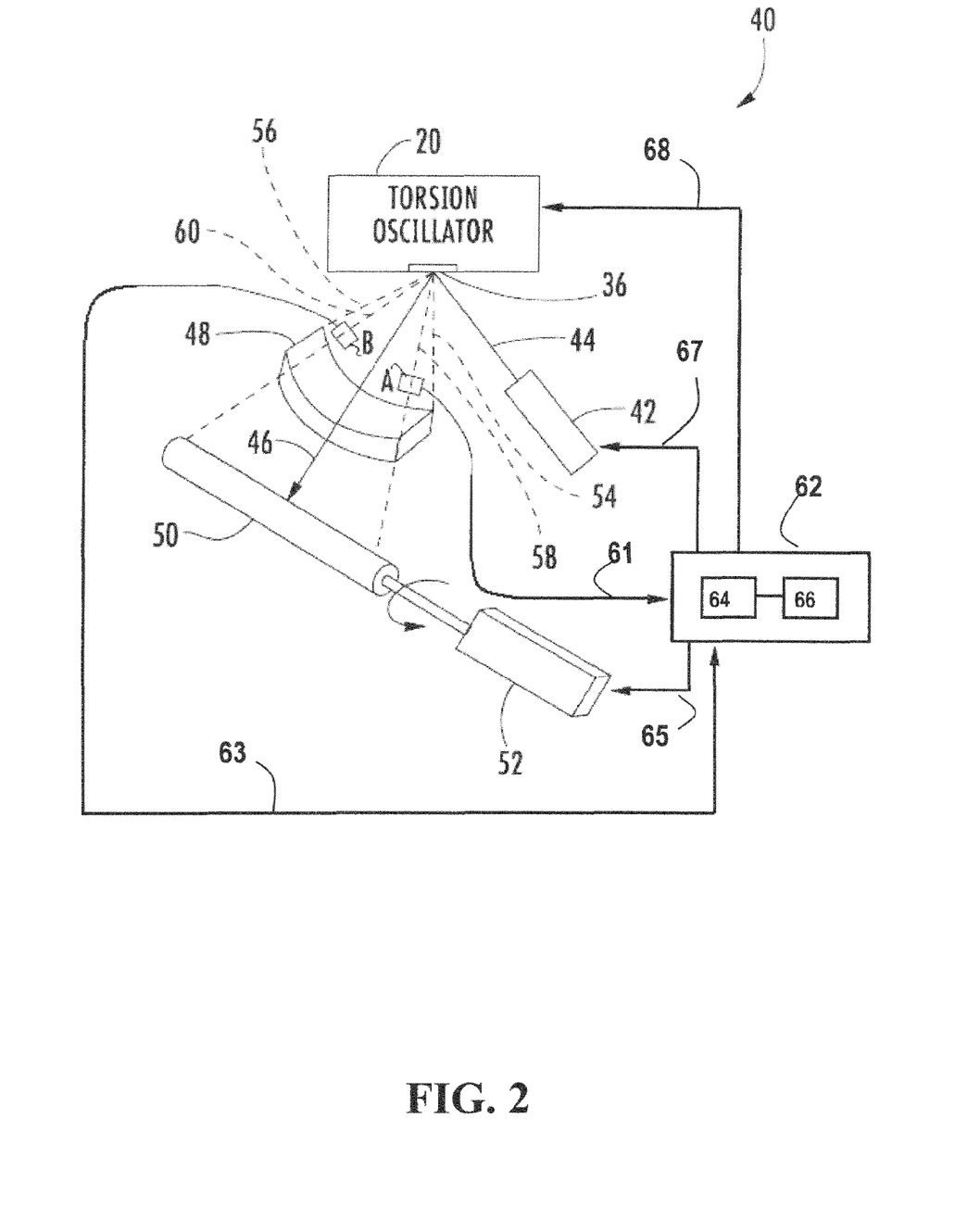
FIG. 2 is a schematic diagram of an imaging system including the torsion oscillator of FIG. 1.

FIG. 2 is a representation of a bidirectional imaging apparatus 40, such as a laser printer 40, including the torsion oscillator 20 of FIG. 1. In FIG. 2, a laser 42 directs a modulated light beam 44 onto the oscillating mirror 36 which is reflected to form a scanned beam represented by middle line 46. The scanned beam 46 is directed through an optical system 48 represented as a lens 48 and onto a rotating photoconductive drum 50 rotated at a controlled rate by a drive system 52.

The reflected light beam represented by the middle line 46 is scanned through a scan path having extremes or outer limits represented by dash lines 54 and 56. An imaging window defined by dash lines 58 and 60 is included within the scan path 54, 56. In the embodiment of FIG. 2, sensors A and B are located within the outer limits represented by the dash lines 54 and 56, more particularly, on the imaging window dash lines 58 and 60. The sensors A and B generate respective electrical signals when the reflected light beam passes the particular sensor. There are a variety of locations where the sensors A and B may be positioned, either inside or outside the optical system represented by the lens 48. In some embodiments, only one sensor is present. A mirror may be placed, for example, in the location of sensor A in order to reflect the scan of the laser to sensor B. Thus, only one electrical signal is produced.

Block 62 represents controller logic 62 including at least a processor 64 and non-volatile memory 66. The controller logic 62 receives an input signal 61 from sensor A and an input signal 63 from sensor B. As discussed below, the input signal 61 and 63 indicate instances when the scanned beam 46 crosses the sensors A and B. The controller logic 62 controls the drive system 52, the laser 42, and the torsion oscillator 20 via control signals 65, 67, and 68 respectively. Control of the torsion oscillator 20 may be open-loop or closed-loop control. Also, in order to determine certain operating parameters such as the resonant frequency of the torsion oscillator 20, either open-loop or closed-loop methods or both in combination may be employed by the control logic 62. In general terms, an open-loop controller is one that computes its input into the system only from the current state and a predetermined model of the system. That is, an open-loop controller does not take into consideration feedback from the output of the system in order to determine the system input. Conversely, a closed-loop controller receives feedback from the output of the system and uses such feedback in determining the input of the system. In this case, the controller logic 62 functions as both a closed-loop controller and as an open-loop controller in the several embodiments. When functioning as a closed-loop controller, the controller logic 62 receives feedback signals 61 and 63 from sensors A and B and adjusts its output signal 68 to the torsion oscillator 20 in order to reach a desired output, which, for example, may be the desired scan amplitude of the scanned beam 46. Also, the controller logic 62 may receive feedback signals 61 and 63, and store such signals 61 and 63 or information corresponding to such signals for later use. In such a case, the system 40 operates in an open-loop mode but continues to monitor feedback for reasons other than contemporaneous modification of input signals 65, 67 and 68.

Figure 3:
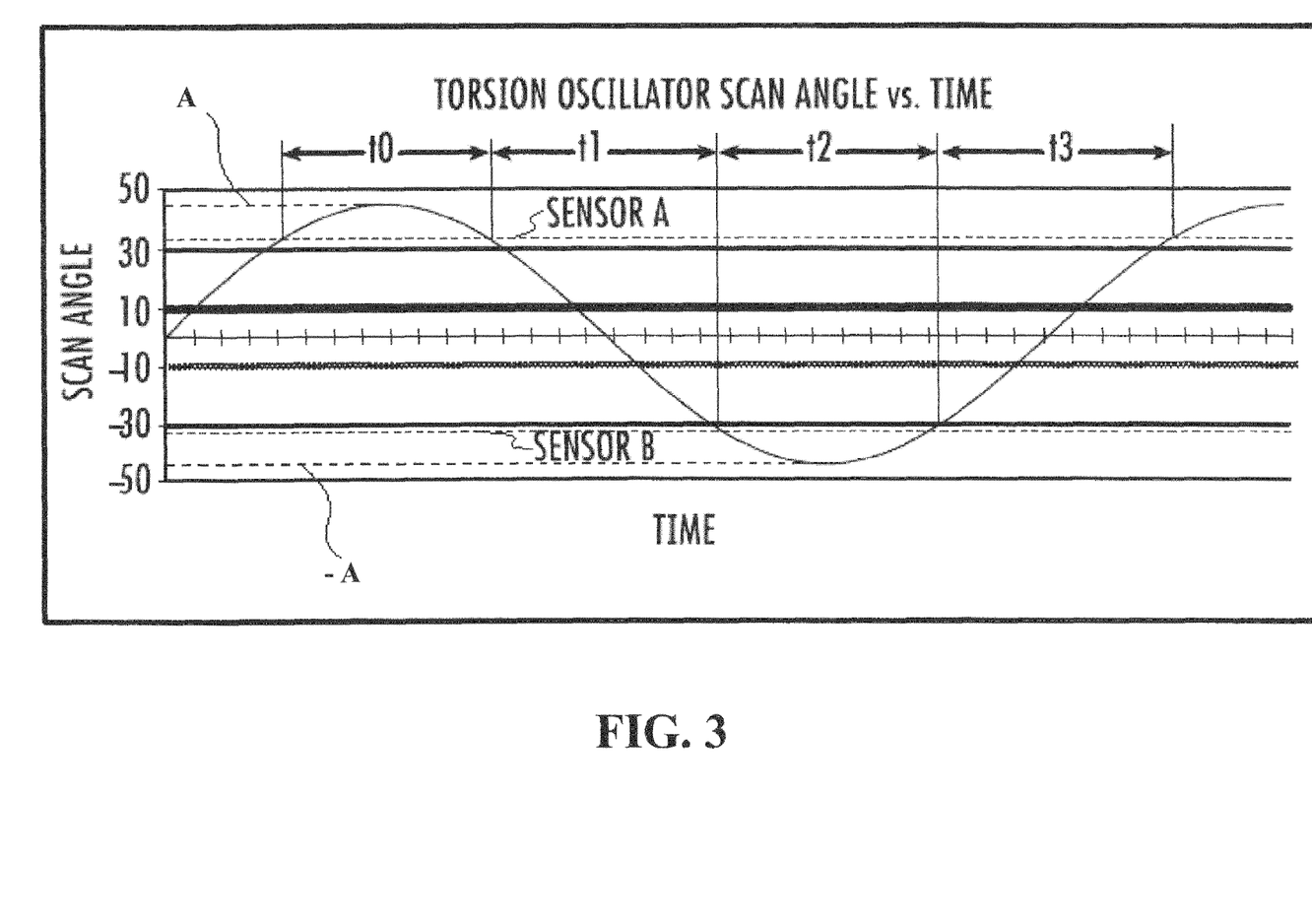
FIG. 3 is a plot of scan angle as a function of time.

FIG. 3 is a plot of scan angle of the scanned beam 46, with time intervals referred to herein as t0, t1, t2 and t3. Time interval t1 corresponds to the time available for forward direction printing in a bidirectional laser printing imaging system, and time interval t3 corresponds to the time available for reverse direction printing in a bidirectional printing laser printer imaging system. The time intervals t0 and t3 thus correspond to the imaging window 58, 60 and are substantially equal. It is important to control time interval t1 (and thus time interval t3) in order to maintain a fixed line length in the laser printer 40 for a given oscillation frequency and a given optical system.

Relating FIG. 3 to the FIG. 2 sensors A and B, the beam first encounters sensor A, known to be located where the beam is at a predetermined scan angle a, corresponding to one end 58 of the imaging window. After the beam crosses angle a moving toward the outer limit 54, the beam is again sensed by sensor A as it returns. The interval between these two crossings of sensor A is time interval t0, which may be termed a "turnaround" interval. Forward direction printing time interval t1 then occurs, while the beam moves to be sensed by sensor B, known to be located where the beam is at scan angle b, corresponding to the other end 60 of the imaging window. After crossing angle b, the beam again is sensed by sensor B as it returns. The interval between these two crossings of sensor B is time interval t2, which is another "turnaround" interval. Then, reverse direction printing time interval t3 is the time between the second consecutive sensing of the beam by sensor B and the next sensing of the beam by sensor A, and the cycle repeats. Rotation from sensor A to sensor B may be referred to as direction AB, and corresponds to time interval t1. Rotation from sensor B to sensor A may be referred to as direction BA, and corresponds to time interval t3.

The period is expressed as t0+t1+t2+t3, and the frequency of oscillation is the reciprocal of the period. The difference between t0 and t2 is a function of the location of the sensors A and B with respect to the median of the beam sweep and defines the median offset.

Keeping the above discussion in mind, various control strategies may be employed to control the torsion oscillator 20. Briefly, for a given oscillation frequency, either the scanning time interval t1 or the scanning time interval t3 is measured, and a feedback controller such as the controller logic 62, develops a drive power control signal to maintain either t1 or t3 at a desired constant. In addition, the difference between t0 and t2 (e.g., t2−t0) is measured or calculated, and another feedback controller (part of the controller logic 62) develops an offset control signal to maintain a constant offset. A constant scan interval (t1 or t3) together with a constant offset (t2−t0) maintains the imaging window 58, 60 portion of the scan angle sine wave used for printing (i.e., between the locations of sensors A and B) in a fixed location.

As discussed above, controlling the scan of the torsion oscillator 20 is typically done by closed-loop scan amplitude control. The resonant frequency of the torsion oscillator 20 may be determined by driving the torsion oscillator 20 at various frequencies at a constant drive level and determining which frequency produces a peak amplitude of oscillation, which is deemed the open-loop resonant frequency. Once an overshoot is applied to determine a drive frequency, the torsion oscillator 20 may be operated with closed-loop amplitude control drive frequency. The drive level chosen for the open-loop frequency sweep should be chosen to produce a peak amplitude of oscillation that is substantially equal to the amplitude of oscillation during closed-loop steady state operation. Otherwise, the torsion oscillator 20 may operate in an off-resonance mode which is undesirable. Such off-resonance mode is characterized by non-linear print artifacts in unidirectional imaging systems and as non-linear print artifacts as well as scan-to-scan misalignment in bidirectional imaging systems.

FIGS. 4A-4E illustrate a method for determining the drive frequency of the torsion oscillator. The first step in the method is to determine nominal operation parameters (also referred to as "operation parameter starting points"). The nominal operation parameters include a nominal drive level $P_n$, a nominal frequency overshoot ($OS_{fn}$) and a nominal resonant frequency $f_{rn}$. These nominal operation parameters may be initially determined during manufacture and stored in non-volatile memory 62. When the oscillator is powered on from an off state, an open-loop frequency sweep 74 is performed in order to determine an open-loop resonant frequency ($f_{rOL}$).

Figure 4A:
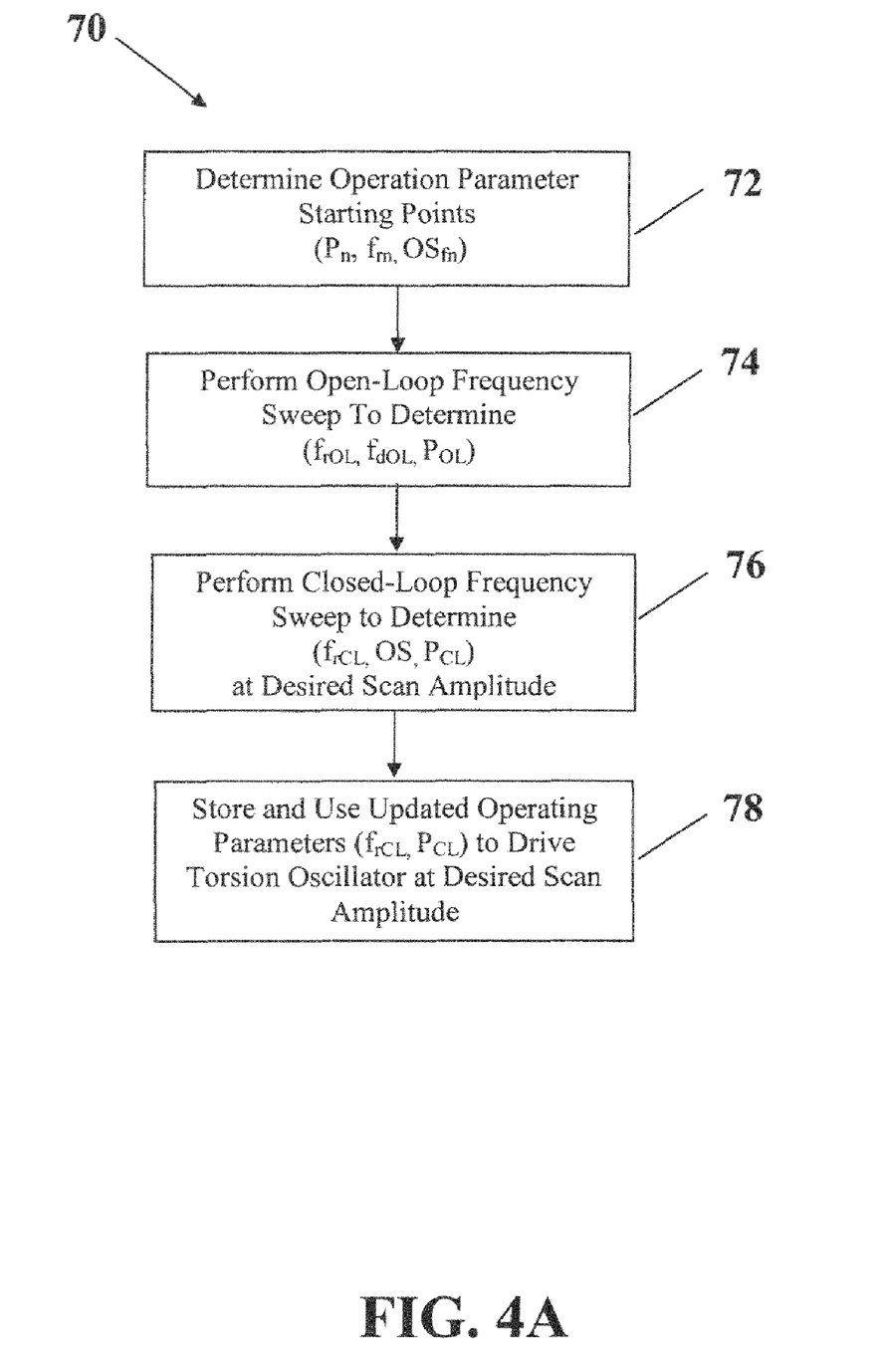
FIGS. 4A-4E are flowcharts of a method for controlling and reducing the potential effects of ambient environmental conditions on the accuracy of the scan the scan of a torsion oscillator.
Figure 4B:
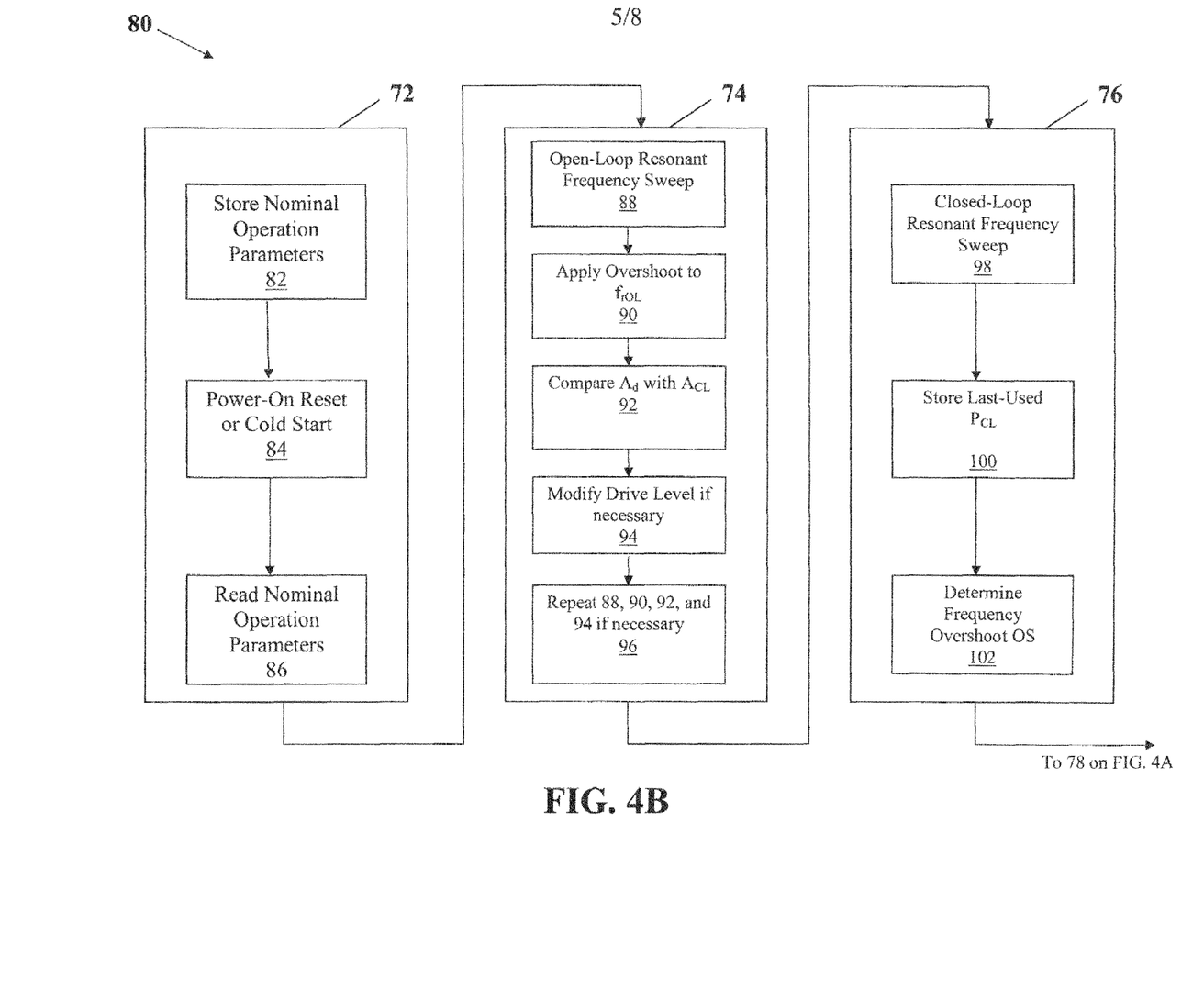

Next, a closed-loop frequency sweep 76 is performed to determine and store a closed-loop steady-state resonant frequency ($f_{rCL}$), a frequency overshoot (OS), and a closed-loop steady-state drive level ($P_{CL}$). Finally, the closed-loop steady-state resonant frequency (also referred to as the "operating frequency") is used to operate the torsion oscillator 20 in a stable closed-loop mode 78. This mode of operation is stable because the torsion oscillator sweep is maintained at the desired scan amplitude and the operating frequency by controlling and modifying the drive level as necessary.

This method accounts for changes in ambient environmental conditions between the conditions present at the manufacturing site and conditions present at the operation site. For example, if the resonant frequency of the torsion oscillator is determined at the manufacturing site and used at the operation site without taking into account changes in environmental conditions, the torsion oscillator 20 may operate in an off-resonant mode. To overcome this problem the operating parameters are updated at new operation sites.

To update the operating parameters, an open-loop frequency sweep 74 is performed at every power-up or power-on reset and at every warm-up from a standby state. This open-loop sweep 74 determines an updated open-loop resonant frequency $f_{rOL}$. Next, a closed-loop sweep is performed to determine a closed-loop resonant frequency ($f_{rCL}$). The difference between the open-loop resonant frequency and the closed-loop resonant frequency is the frequency overshoot ($OS=f_{rOL}-f_{rCL}$).

Referring now to FIGS. 4B, 4C, 4D, and 4E, a more detailed flowchart 80 of the method of FIG. 4A is shown. As indicated at block 82, nominal operation parameters are first stored during the manufacturing process. When the oscillator is turned on at step 84, the parameters are read from memory (step 86) and used to determine starting points. Next, an open loop resonant frequency sweep 88 is performed to determine the open-loop resonant frequency $f_{rOL}$. The nominal frequency overshoot $OS_{fn}$ is subtracted from $f_{rOL}$ to determine the open-loop drive frequency $f_{dOL}$ as represented by block 90. Then the scan amplitude $A_d$ at the open-loop drive frequency is compared to the desired scan amplitude $A_{CL}$ (stored in memory) as represented by block 92. If the difference between $A_d$ and $A_{CL}$ is too large, the open loop drive level $P_{OL}$ is modified as necessary, and the open-loop sweep 88 is performed again and again until $A_d$ is within a defined range of $A_{CL}$. The drive level for a repeat open-loop resonant frequency sweep 88 (if necessary) may be determined by adding or subtracting the open-loop drive level $P_{OL}$ to the nominal drive level $P_n$. In this case the open-loop drive level $P_{OL}$ functions much like an offset for the nominal drive level $P_n$, which typically remains constant once stored in memory. This embodiment requires an offset calculation to be performed in order to determine the drive level at which the open-loop resonant frequency sweep 88 is performed. Alternatively, the drive level for a repeat open-loop resonant frequency sweep 88 may be the open-loop drive level $P_{OL}$ stored in memory. In this case, the open-loop drive level $P_{OL}$ represents the combination of nominal drive level $P_n$ and any necessary offset so that no pre-sweep calculation is necessary. This process is described in further detail with reference to FIG. 4D below.

Referring to steps 98, next a closed-loop frequency sweep 98 is performed, and the closed-loop steady-state resonant frequency ($f_{rCL}$) is determined. Finally, the frequency overshoot OS is determined ($OS=f_{rOL}-f_{rCL}$) and a closed-loop drive level $P_{CL}$, may be determined in some embodiments. The process of step 76 is described in further detail with reference to FIG. 4E below. At this point in the process, the system may be operated in closed-loop amplitude control at $f_{rCL}$ starting with $P_{CL}$ in order to achieve stable operation while maintaining the desired scan amplitude.

Figure 4C:
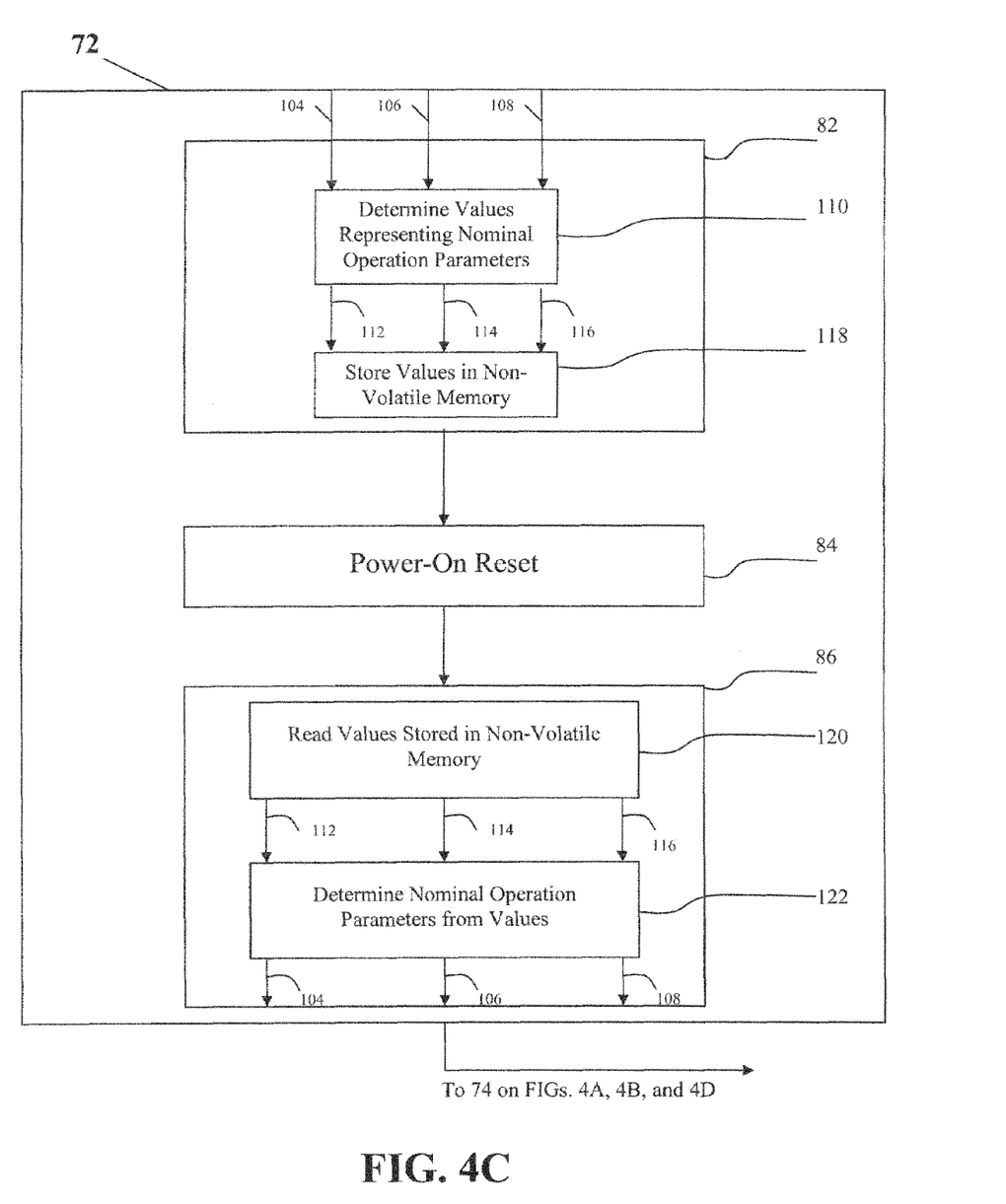

Referring now to FIG. 4C in order to describe the method in further detail, block 72 is expanded. The storing nominal operation parameters step 82 includes either determining factory operating parameters or receiving operating parameters from the most recent operation of the torsion oscillator 20. The nominal operating parameters 104, 106, and 108 include the nominal resonant frequency 104 of the torsion oscillator 20, the nominal frequency overshoot 106 and the nominal drive level 108. Values 112, 114, and 116 corresponding to the nominal operating parameters 104, 106, and 108 are determined as represented by block 110. Then the determined values 112, 114, and 116 are stored in a non-volatile memory 66 (FIG. 2) as represented by block 118. In an alternate embodiment, the nominal operating parameters 104, 106, and 108 themselves may be stored in non-volatile memory 66, which eliminates method step 110.

Every time the imaging system 40 is reset, for example during a power-on reset 84, values corresponding to nominal operating parameters, either from factory setup or from previous operation of the torsion oscillator 20 are read from non-volatile memory 66 as represented by block 120. The nominal operation parameter values may include values corresponding to resonant frequency 112, frequency overshoot 114, and the drive level (power level) necessary for operation at the desired scan amplitude. Alternatively, the information may be the nominal operation parameters themselves: nominal resonant frequency 104, nominal frequency overshoot 106, and nominal drive level 108. The parameters 104, 106, and 108 must be determined based on the values 112, 114, and 116. This step is represented by block 122. Then the nominal operation parameters 104, 106, and 108 are used as starting points for determining the current resonant frequency and other updated parameters.

Figure 4D:
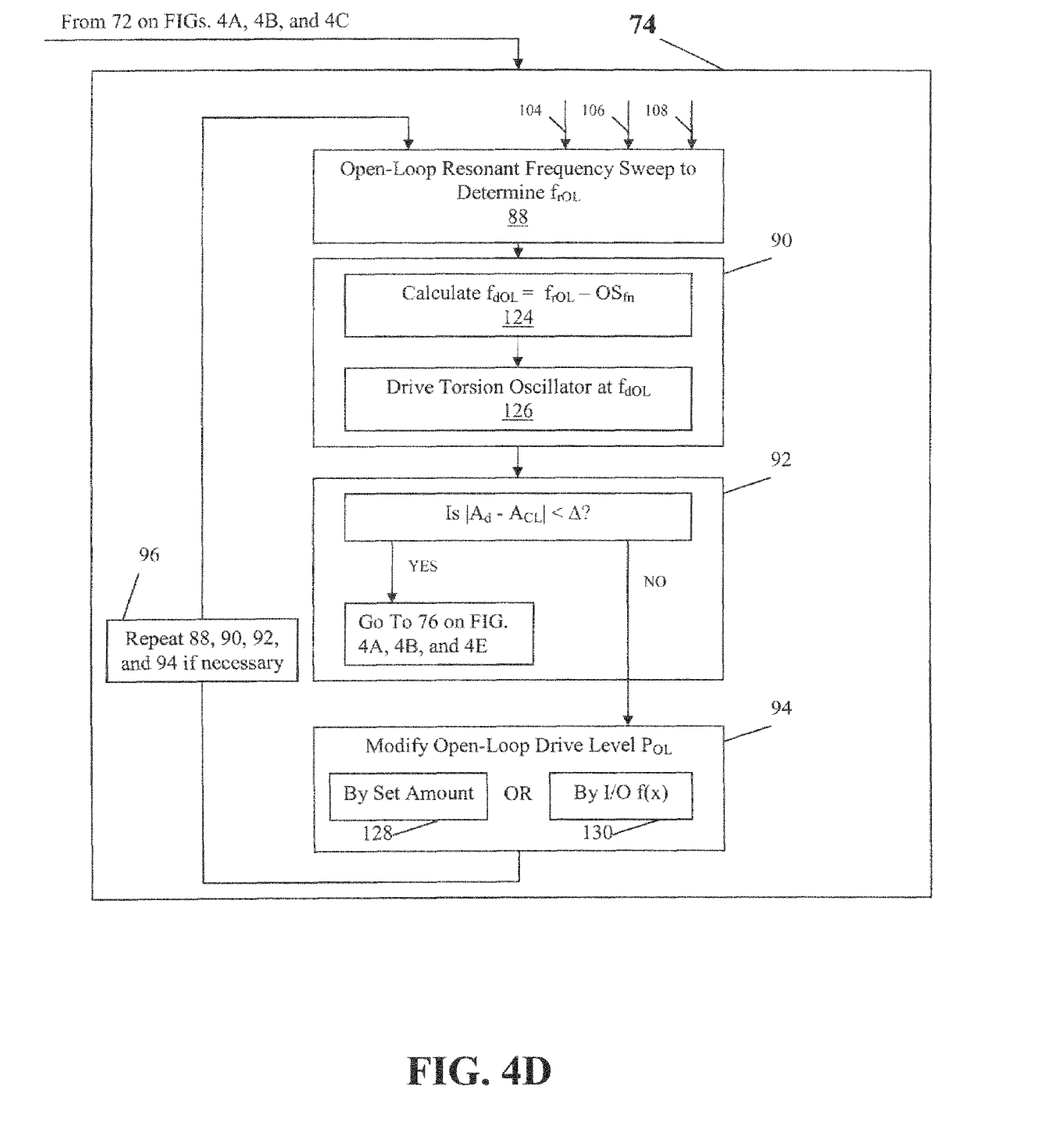

Referring now to FIG. 4D, the open-loop resonant frequency sweep of method step 74 is expanded with more detail. Once the control logic 62 has determined the stored parameters 122 (FIG. 4C), it performs an open-loop resonant frequency sweep 88. The nominal operation parameters 104, 106, and 108 are used to determine starting points for the control logic 62 and reduce the number of iterations necessary to complete the frequency sweep 88. In other words, the most recently stored nominal resonant frequency 104, less a fixed amount, and the corresponding nominal drive level 108 are used as starting points in the first iteration of the frequency sweep 88. In this case, the open-loop resonant frequency sweep 88 is performed by driving the torsion oscillator 20 at various frequencies. The frequencies used in the sweep are typically periodic; for example, the first iteration could be performed at a frequency of 1.00 kHz, the second at 1.01 kHz, the third at 1.02 kHz, etc. A hypothetical example is shown in TABLE 1 below and is only for illustrative purposes; the data is not from an actual experiment. In each instance, the scan amplitude is determined by monitoring the signals 61 and 63 from sensors A and B respectively. However, the output of the system, that is, signals 61 and 63 are not used to determine the system input. Thus, this frequency sweep is referred to as an open-loop frequency sweep 88.

TABLE 1

EXAMPLE OF OPEN-LOOP RESONANT FREQUENCY SWEEP 88

| Input (frequency in kHz) | Output (Scan Angle or Amplitude in degrees) |
|---|---|
| 1.00 | 30 |
| 1.01 | 38 |
| 1.02 | 41 |
| 1.03 | 44 |
| 1.04 | 45 |
| 1.05 | 43 |
| 1.06 | 41 |
| 1.07 | 37 |
| 1.08 | 30 |

In this example, the resonant frequency 104 stored from the last torsion oscillator operation (or from the factory if this is the system's first operation outside the factory) is 1.04 kHz. The control logic 62 then determines the range of the frequency sweep and either the number of divisions the range is divided into or the incremental amount each frequency will differ. Alternatively, more samples may be taken close to the stored resonant frequency and fewer samples taken farther away from the stored resonant frequency, because the current resonant frequency is more likely to be situated close to the stored resonant frequency. In this case, the range is 0.08 kHz and the periodic incremental value is 0.01 kHz. The range is then centered around the stored resonant frequency 104, which has a value of 1.04 kHz. The open-loop frequency sweep 88 may begin by driving the torsion oscillator 20 at any of the incremental frequencies and then stepping through the other frequencies, however, typically the sweep begins at either the lowest or the highest frequency. For example, the sweep would typically begin at 1.00 kHz and step through to 1.08 kHz or begin at 1.08 kHz and step through to 1.00 kHz, but the sweep 88 may also begin at any of the other frequencies as long as all of the incremental frequencies are tested.

Each amplitude value is coupled with the frequency in a frequency-amplitude target pair (f, A). The frequency is the input variable during the open-loop frequency sweep and the amplitude is the output variable, that is, the variable that is determined when the frequency is input into the system. The control logic 62 next determines the greatest scan amplitude from the group of amplitude values determined during the frequency sweep. This amplitude is termed the peak amplitude and is referred to as $A_{OL}$. The peak amplitude corresponds with the open-loop resonant frequency $f_{rOL}$ of the torsion oscillator 20. In other words, when the torsion oscillator 20 is driven such that the scan is operating at a peak amplitude or largest scan angle, the frequency associated with that peak amplitude is the open-loop resonant frequency $f_{rOL}$ of the torsion oscillator 20. However, the resonant frequency determined by the open-loop sweep (which is referred to as "$f_{rOL}$") is typically not the actual resonant frequency but is relatively close to the actual resonant frequency.

Referring to TABLE 1, the maximum or peak amplitude is 45 degrees, which corresponds to an input frequency of 1.04 kHz. In this example, the nominal resonant frequency, which was used as a starting point happens to be the same as the open-loop resonant frequency, $f_{rOL}$. This may occur if the environmental conditions ambient to the torsion oscillator 20 are substantially the same as such conditions were when the torsion oscillator 20 last stored operating parameters in the non-volatile memory 66. However, if environmental conditions have changed or if the stored nominal resonant frequency 104 is inaccurate for some reason, the open-loop frequency sweep 88 may determine an open-loop resonant frequency $f_{rOL}$ different than the nominal resonant frequency, $f_{rn}$. In some embodiments, the control logic 62 may perform multiple iterations of the open-loop frequency sweep 88 in order to improve the accuracy of the sweep. This may be performed by determining the peak amplitude in a first frequency sweep and subsequently defining a new, smaller range of sweep frequencies with new, smaller incremental steps between them. With reference to the above example such second iteration frequency sweep may be done over the range from 1.03 kHz to 1.05 kHz in increments of 0.02 kHz with results as illustrated in TABLE 2 below.

TABLE 2

SECOND ITERATION OF OPEN-LOOP RESONANT FREQUENCY SWEEP 88

| Input (frequency in kHz) | Output (Scan Angle or Amplitude in degrees) |
|---|---|
| 1.030 | 44.09 |
| 1.032 | 44.61 |
| 1.034 | 44.90 |
| 1.036 | 45.04 |
| 1.038 | 45.11 |
| 1.040 | 45.03 |
| 1.042 | 44.87 |
| 1.044 | 44.62 |
| 1.046 | 44.08 |
| 1.048 | 43.35 |
| 1.050 | 42.51 |

As shown in TABLE 2, the maximum or peak amplitude determined is 45.11 degrees in the second iteration of the open-loop frequency sweep 88 example. This corresponds to a frequency of 1.038 kHz, which is the new open-loop resonant frequency ($f_{rOL}$). It should be noted that the open-loop resonant frequency and the number 1.038 kHz is a value intended to approximate the actual resonant frequency of the torsion oscillator 20. The actual resonant frequency is a characteristic of the torsion oscillator that is dependent on environmental conditions, and it should be understood the numbers determined by this method are approximations which may have a range of error. The number of iterations of the frequency sweep depends upon the desired level of accuracy regarding the resonant frequency. For example, if the desired level of accuracy of the resonant frequency was ±2 degrees, then the second iteration of the frequency sweep discussed with reference to TABLE 2 above would not have been necessary. Likewise, if the desired tolerance was 0.001 degrees, further iterations may be necessary.

Referring back to FIG. 4D, the above described iterations of the open-loop frequency sweep 88 are described in more detail with reference to steps 90, 92, 94, and 96. Once an iteration of the open-loop sweep 88 is performed, the next step is to determine the open-loop drive frequency ($f_{dOL}$), illustrated as step 90. This step is divided into two sub-steps, the first of which is represented by block 124 and the second of which is represented by block 126. The first is to subtract the nominal frequency overshoot ($OS_{fn}$) from $f_{rOL}$, which was determined in step 88. The second is to drive the torsion oscillator at the drive frequency, or $f_{dOL}=(f_{rOL}-OS_{fn})$. The nominal frequency overshoot is the parameter represented by arrow 108 on FIG. 4C and which was determined (in step 122) from the stored value 116. As discussed above regarding TABLE 1, the peak amplitude was determined to be 45 degrees. However, during the sweep, the system must apply at least one input frequency beyond 1.04 kHz in order to determine that 45° is the peak amplitude.

The peak may be determined in a variety of ways. In one embodiment, the peak amplitude $A_{OL}$ is determined by fitting a curve to the graph of the frequency amplitude pairs and calculating $A_{OL}$. This calculated value, however, typically corresponds to an $f_{rOL}$ greater than the actual resonant frequency. This is substantially due to the method of performing the open-loop sweep 88. The open-loop sweep 88 is performed relatively quickly, that is, the system is not provided sufficient time to settle on an amplitude before a measurement is taken.

Next, the torsion oscillator 20 is driven at the open-loop drive frequency ($f_{dOL}$), and the amplitude of the laser scan ($A_d$) is compared to the desired scan amplitude $A_{CL}$, as represented by block 92. The closed-loop steady-state amplitude ($A_{CL}$) is also referred to as the desired scan amplitude at which the system is driven during normal operation using closed-loop amplitude control.

The comparison is performed based on a predetermined acceptable difference value, referred to as "Δ". This value is stored in the non-volatile memory 66 of the control logic 62. If the measured drive amplitude ($A_d$) is within the acceptable difference value, Δ, of the desired scan amplitude ($A_{CL}$) then the method progresses to operating the system using the updated operating parameters represented by step 76 on FIG. 4E (also shown on FIGS. 4A and 4B). If $A_d$ is not within the acceptable difference value of $A_{CL}$ then the drive level is modified as represented by block 94. The modification may be either by a set amount 128 retrieved from the non-volatile memory 66 or by a characterized input-output function 130. Then steps 88, 90, 92, and 94 (if necessary) are repeated until $|A_d-A_{CL}|<\Delta$ as illustrated by block 96.

At this point, the imaging system 40 has determined an updated open-loop drive frequency (which corresponds to the resonant frequency of the torsion oscillator as determined by the open-loop sweep 88) that produces approximately the same scan amplitude as the desired amplitude during closed-loop steady-state operation. This number, $f_{rOL}$, as well as the open-loop drive level ($P_{OL}$), are stored in the non-volatile memory 66 at this point in the process. This storing may be done with or without conversion of the parameters to a value representing the parameters, such as 114 and 116, or they may be stored as described above with regard to block 82 on FIG. 4C after all the necessary operation parameters have been updated such as at the end of the method.

In other alternate embodiments, performing a closed-loop resonant frequency sweep to determine a factory drive level in order to ensure the drive amplitude $A_d$ is approximately equal to the closed-loop steady-state amplitude $A_{CL}$ in step 92 may be performed in the manufacturing stage of the imaging system 40. The results of such test are stored as factory operation parameters in non-volatile memory 66 and retrieved before step 92. The torsion oscillator 20 is driven at the nominal drive level (which may be the factory drive level) retrieved from the non-volatile memory 66, which typically reduces the chances that the comparison of step 92 is unsuccessful and may reduce the necessary number of iterations (step 96). In these embodiments the time-to-first-print would not suffer because the closed-loop sweep is performed on the manufacturing line.

Figure 4E:
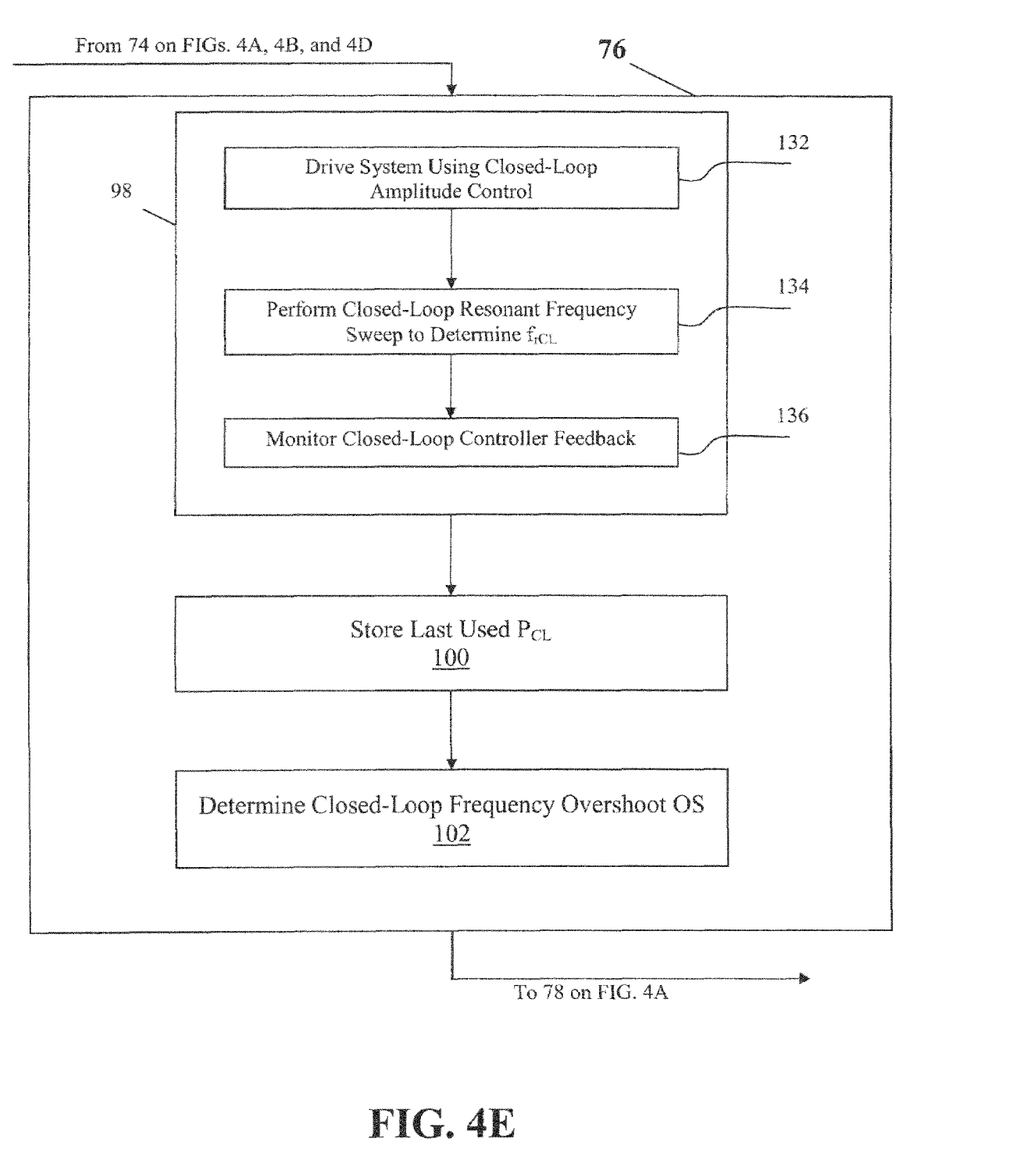

Referring now to FIG. 4E, performing a closed-loop frequency sweep, represented by block 76, is shown in further detail. Step 76 is broken into three sub-steps 98, 100, and 102 as shown on FIGS. 4B and 4E. Sub-step 98 is broken into three further sub-steps: driving the torsion oscillator 20 using closed-loop control, performing a closed-loop frequency sweep, and monitoring closed-loop controller feedback, represented by blocks 132, 134, and 136 respectively.

The first sub-step of block 98 is to drive the imaging system 40 using closed-loop scan amplitude control. As discussed above with regard to FIG. 2, feedback signals 61 and 63 from sensors A and B (FIG. 2), respectively, provide information regarding the output (scan amplitude) of the imaging system 40 and such information may be used by the control logic 62 in determining the input signals 65, 67, and 68. Next, the imaging system 40 performs a closed-loop resonant frequency sweep, as represented by block 134, while monitoring the feedback signals 61 and 63 from sensors A and B as represented by block 136. The feedback signals 61 and 63 are used to determine any drive level adjustments necessary to maintain steady-state operation of the torsion oscillator 20 at the desired scan amplitude. The control logic 66 interprets the feedback signals 61 and 63 and produces a torsion oscillator input signal 68, also referred to as the drive level, necessary to maintain operation of the torsion oscillator 20 at the desired scan amplitude. The term "sweep" as used herein includes any method for testing a plurality of frequencies in order to determine a value corresponding to a resonant frequency including periodically stepping through frequencies as described above, monitoring feedback and moving in the direction of diminishing feedback, a random test, or any other method for testing a plurality of frequencies.

Once the sweep is complete, the torsion oscillator drive level 68 with the lowest power is flagged, and the frequency corresponding with the flagged drive level is chosen as the closed-loop steady-state resonant frequency ($f_{rCL}$).

The next step is to determine the frequency overshoot (OS) of the open-loop sweep 88, which is represented by block 102. OS is determined by finding the difference between the open-loop resonant frequency $f_{rOL}$ determined by the open-loop frequency sweep of step 88 and the closed-loop steady-state resonant frequency $f_{rCL}$ so that: $OS=f_{rOL}-f_{rCL}$. The frequency overshoot is primarily a function of air density and will not typically change unless the rate at which the open-loop frequency sweep 88 is conducted changes. Therefore, the closed-loop resonant frequency sweep 76 need not be repeated until the next power-on-reset. The open-loop resonant frequency sweep 88 is repeated at every Warm-up from a standby state, and the frequency overshoot OS is applied to the open-loop resonant frequency $f_{rOL}$ to determine the open-loop drive frequency $f_{dOL}$. The system is then operated at the drive level $P_{CL}$ and the determined open-loop drive frequency $f_{dOL}$ after a Warm-up from a standby state. On the other hand, if the system 40 performs a power-on reset, both an open-loop resonant frequency sweep 88 and a closed-loop resonant frequency sweep 98 are performed as discussed above, and the system 40 is operated at the $f_{rCL}$ as discussed below.

Thus, the imaging system 40 has determined updated operation parameters including the frequency overshoot (OS), the open-loop resonant frequency ($f_{rOL}$), and the closed-loop drive level $P_{CL}$. These operation parameters are stored in the non-volatile memory 66 at this point as the nominal operation parameters 104, 106 and 108.

The final step in the process is to operate the torsion oscillator 20 in closed-loop scan amplitude control using the closed-loop resonant frequency ($f_{rCL}$) and the closed-loop drive level $P_{CL}$ as a starting drive level, which step is represented by block 78 on FIG. 4A. The control logic 62 drives the torsion oscillator initially at the closed-loop drive level $P_{CL}$. The control logic 62 monitors the feedback and modifies the drive level as required in order to drive the torsion oscillator 20 at the desired scan amplitude and at $f_{rCL}$. In this embodiment, the imaging system 40 stores the modified drive level as the new closed-loop drive level $P_{CL}$.

All of the values either measured or determined above may be stored in the non-volatile memory 66. However, it should be understood that fewer than all of the values may be stored. For example, in one embodiment, $f_{rOL}$, OS, and $P_{CL}$ are stored as the nominal operation parameters, but in another embodiment $f_{dOL}$, OS and $P_{CL}$ are stored. In yet another embodiment, $f_{rOL}$, $f_{dOL}$, and $P_{CL}$ are stored. Likewise, numerous combinations of values may be stored in the various embodiments and subsequently used as starting points or used to determine starting points.

In alternate embodiments, operation parameters are not stored in non-volatile memory 66 before a power-down. In these embodiments, operation parameters 104, 106, and 108 are not used as starting points for the frequency sweeps. In this case, the time required to perform the frequency sweeps 88 and 98 may increase significantly because of the necessity of performing multiple iterations to hone in on an accurate resonant frequency. However, the time-to-first-print (TTFP), which is a benchmark used to indicate printer efficiency, may not be harmed in such an embodiment, unless the open-loop resonant frequency sweep (that is performed on every War-up) is lengthened, because TTFP is typically measured from a standby state not a power-up state such as a power-on reset.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for operating a torsion oscillator of a scanner having a memory and a mirror disposed on the torsion oscillator and a laser beam being reflected by the mirror to scan the laser at a desired scan amplitude, comprising:
   (a) providing at least one value corresponding to an overshoot;
   (b) performing an open-loop resonant frequency sweep to determine at least an open-loop resonant frequency;
   (c) calculating a drive frequency based upon the overshoot and the open-loop resonant frequency;
   (d) driving the torsion oscillator at the calculated drive frequency in closed-loop amplitude control to scan the laser at the desired scan amplitude.

2. The method of claim 1 wherein the overshoot is provided as a stored value in the memory of the scanner during the manufacture of the scanner.

3. The method of claim 1 further comprising:
   monitoring the drive level while driving the torsion oscillator under closed loop control and determining and storing a closed-loop drive level.

4. The method of claim 1 wherein the value corresponding to the overshoot is provided by performing an open-loop frequency sweep to determine the open-loop resonant frequency and performing a closed-loop frequency sweep to determine a closed-loop resonant frequency and determining the value corresponding to the overshoot by calculating the difference between the two resonant frequencies.

5. The method of claim 1 further comprising performing a closed-loop resonant frequency sweep to determine at least a closed-loop steady-state resonant frequency and an updated overshoot corresponding to the difference between the open-loop resonant frequency and the closed-loop steady-state resonant frequency; and storing the updated overshoot in memory.

6. The method of claim 1 further comprising:
   (i) storing nominal operation parameters including a nominal resonant frequency, a nominal drive level, and a nominal frequency overshoot, in the memory before a scanner power-down,
   (ii) reading the nominal operation parameters from the memory subsequent to a scanner power-up; and
   (iii) using at least one of the nominal operation parameters in at least one of the open-loop resonant frequency sweep and a closed-loop resonant frequency sweep.

7. The method of claim 1 further comprising:
   (i) determining the open-loop resonant frequency by driving the torsion oscillator at a nominal drive level and at a plurality of test frequencies and finding a peak amplitude and its corresponding test frequency and storing the corresponding test frequency as the open-loop resonant frequency;
   (ii) comparing a value corresponding to the peak amplitude to a desired scan amplitude;
   (iii) when the value corresponding to the peak amplitude is within an acceptable difference value of the desired scan amplitude, proceeding to step (c); and
   (iv) when the value corresponding to the peak amplitude is not within the acceptable difference value of the desired scan amplitude, modifying the drive level and repeating steps (i)-(iv) until the value corresponding to the peak amplitude is within an acceptable difference from the desired scan amplitude.

8. The method of claim 7 wherein the value corresponding to the peak amplitude is determined by a method comprising:
   subtracting the overshoot from the open-loop resonant frequency to produce the drive frequency;
   driving the scanner at the drive frequency and the nominal drive level and determining the scan amplitude; and
   storing the scan amplitude at the drive frequency as the value corresponding to the peak amplitude.

9. The method of claim 7 wherein the value corresponding to the peak amplitude is the peak amplitude.

10. The method of claim 7 wherein step (i) further comprises storing the open-loop resonant frequency in the memory as a nominal open-loop resonant frequency.

11. The method of claim 7 wherein the modifying of step (iv) comprises modifying the open-loop drive level by a fixed amount stored in the memory.

12. A method for operating a torsion oscillator of a scanner having a memory and a mirror disposed on the torsion oscillator and a laser beam being reflected by the mirror to scan the laser at a desired scan amplitude, comprising:
   (a) performing an open-loop resonant frequency sweep to determine at least an open-loop resonant frequency;
   (b) performing a closed-loop resonant frequency sweep to determine at least a closed-loop steady-state resonant frequency; and
   (c) driving the torsion oscillator at the closed-loop steady-state resonant frequency in closed-loop amplitude control at the desired scan amplitude.

13. The method of claim 12 wherein step (b) comprises:
   (i) driving the torsion oscillator with closed-loop amplitude control;
   (ii) determining the closed-loop steady-state resonant frequency by sweeping a number of frequencies and determining a minimum controller feedback; and
   (iii) determining a frequency overshoot by subtracting the closed-loop steady-state resonant frequency from the open-loop resonant frequency.

14. The method of claim 12 wherein step (b) further comprises:
   (iv) determining a closed-loop steady-state drive level corresponding to the minimum controller feedback and the closed-loop steady-state resonant frequency.

15. The method of claim 14 wherein step (b) further comprises:
   (v) storing the closed-loop steady-state drive level in the non-volatile memory as a nominal drive level.

16. A method for determining parameters for operating a torsion oscillator of a scanner having a mirror disposed on the torsion oscillator and a laser beam being reflected by the mirror, where the torsion oscillator is driven at a selected drive frequency and a drive level controlled to result in a desired scan amplitude of the laser beam, the method also for minimizing an effect of changes in ambient environmental conditions including temperature and air density on an accuracy of the torsion oscillator, the method comprising:

(a) determining a plurality of nominal operation parameters including a nominal resonant frequency, a nominal frequency overshoot, and a nominal drive level in a first environment;

(b) storing the nominal operation parameters in a non-volatile memory;

(c) when the scanner powers-up, reading the nominal operation parameters from the non-volatile memory;

(d) using the nominal resonant frequency less a fixed amount as a starting frequency for performing an open-loop resonant frequency sweep to determine an open-loop resonant frequency, the open-loop resonant frequency sweep being performed by driving the torsion oscillator at the nominal drive level and at a plurality of test frequencies (e) finding a peak amplitude and storing the test frequency corresponding to the peak amplitude as the nominal resonant frequency;

(f) driving the scanner at a drive frequency equal to the nominal resonant frequency less the overshoot and determining a drive amplitude at the drive frequency, (g) when the drive amplitude at the drive frequency is within an acceptable difference value of the desired scan amplitude, proceeding to step (i); and (h) when the open-loop amplitude at the open-loop resonant frequency is not within the acceptable difference value of the desired scan amplitude, modifying the nominal drive level and repeating steps (d)-(h);

(i) driving the torsion oscillator with closed-loop scan amplitude control;

(j) determining a closed-loop steady-state resonant frequency by sweeping a number of frequencies and determining a minimum controller feedback corresponding to the closed-loop steady-state resonant frequency; and (k) determining a frequency overshoot by subtracting the closed-loop steady-state resonant frequency from the open-loop resonant frequency and storing the frequency overshoot in the memory as the nominal frequency overshoot.

17. The method of claim 16 further comprising determining a closed-loop steady-state drive level corresponding to the minimum controller feedback and the closed-loop steady-state resonant frequency.

18. The method of claim 17 further comprising storing the closed-loop steady-state drive level in the memory as the nominal drive level.

19. The method of claim 16 wherein step (a) comprises determining a plurality of factory operation parameters including a factory resonant frequency a factory frequency overshoot and a factory drive level and storing the factory resonant frequency as the nominal resonant frequency in the non-volatile memory, storing the factory frequency overshoot as the nominal frequency overshoot in the memory, and storing the factory drive level as the nominal drive level in the memory.

20. The method of claim 19 wherein determining the plurality of factory parameters in step (a) comprises:

(i) performing an open-loop resonant frequency sweep to determine at least a factory resonant frequency and (ii) performing a closed-loop resonant frequency sweep to determine at least a a factory frequency overshoot and a factory drive level.

* * * * *